United States Patent
Jensen et al.

(10) Patent No.: US 12,442,960 B2
(45) Date of Patent: Oct. 14, 2025

(54) SPHERICALLY MOUNTED RETROREFLECTOR

(71) Applicant: LEICA GEOSYSTEMS AG, Heerbrugg (CH)

(72) Inventors: Thomas Jensen, Rorschach (CH); Danick Brühlmann, Staad (CH); Markus Fäs, Oberkulm (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 431 days.

(21) Appl. No.: 17/891,906

(22) Filed: Aug. 19, 2022

(65) Prior Publication Data
US 2023/0059266 A1   Feb. 23, 2023

(30) Foreign Application Priority Data
Aug. 20, 2021   (EP) ..................................... 21192425

(51) Int. Cl.
*G02B 5/122*   (2006.01)
*G02B 7/18*    (2021.01)

(52) U.S. Cl.
CPC ........... *G02B 5/122* (2013.01); *G02B 7/1805* (2013.01); *G02B 7/181* (2013.01)

(58) Field of Classification Search
CPC ....... G02B 5/122; G02B 7/1805; G02B 7/181
USPC .......................................................... 359/529
See application file for complete search history.

(56) References Cited

U.S. PATENT DOCUMENTS

| | | | |
|---|---|---|---|
| 2014/0098382 A1* | 4/2014 | Bridges | G01C 15/002 356/614 |
| 2014/0340750 A1* | 11/2014 | Neal | B29D 11/00605 156/292 |
| 2016/0282525 A1* | 9/2016 | Evans | G01C 15/06 |

FOREIGN PATENT DOCUMENTS

| | | | |
|---|---|---|---|
| DE | 102006046435 A1 | 4/2008 | |
| DE | 102006046435 B4 * | 8/2008 | ............ G01C 15/02 |
| WO | 2016153527 A1 | 9/2016 | |

OTHER PUBLICATIONS

DE-102006046435—Aug. 2008—Dreier H—English translation.*
Extended European Search Report in Application No. 21192425.3 dated Feb. 3, 2022.

* cited by examiner

*Primary Examiner* — Sharrief I Broome
(74) *Attorney, Agent, or Firm* — Maschoff Brennan

(57) ABSTRACT

A spherically mounted retroreflector comprising an optic inlay, the optic inlay comprising a retroreflector having a vertex and an axis of symmetry, and a carrier having an at least partly spherical outer surface and a cavity, wherein the optic inlay is arranged in the cavity, and wherein the at least partly spherical outer surface has a sphere center, which sphere center coincides with the vertex, wherein the optic inlay is connected to the carrier. The optic inlay comprises a coupling portion, and the spherically mounted retroreflector comprises a coupling element arranged between the optic inlay and the carrier.

15 Claims, 3 Drawing Sheets

SPHERICALLY MOUNTED RETROREFLECTOR

BACKGROUND

The present disclosure relates to a system according to the preamble of the independent claim.

Retroreflectors as known in the state of the art are typically either provided as solid glass retroreflectors or as hollow prisms.

For solid glass prisms, measuring the 3D position of the triple point of the solid glass prism is dependent on a measuring angle due to refraction in the glass. High-precision measurements of absolute positions for industrial measurement tasks are therefore difficult to accomplish using solid glass prisms. Solid glass prisms are therefore typically only used for monitoring applications for which it is sufficient to perform measurements of relative position changes.

Hollow prisms used as retroreflectors typically comprise three reflective surfaces, wherein incoming light is reflected back along the opposite direction (opposite with respect to an incoming direction) by the hollow prism. The reflection is in general provided through direct reflection at the three reflective surfaces of the hollow prism. An advantage of hollow prism retroreflectors over solid glass prism retroreflectors is that for hollow prism retroreflectors the back-reflecting of incoming light is not influenced by refraction. The three reflective surfaces need, however, to be precisely orientated with respect to one another in order to avoid dihedral angle errors. It is furthermore important that the three reflective surfaces have a high degree of planarity. Hollow prism retroreflectors are also known as cube-corner retroreflectors.

For interferometric distance measurement, e.g. helium-neon laser interferometry in a laser tracker, dihedral angle errors and non-planarity of the reflective surfaces can lead to a reduction in possible measurement distance: returning light no longer interferes constructively with internal reference light, resulting in a loss of contrast of the interferometric measurement signal.

Hollow prism retroreflectors are typically either built using a molding process or by gluing three reflective surfaces to each other, which three reflective surfaces need to be precisely oriented to each other. Both molding processes and gluing are complex and therefore costly.

For stability and protection purposes, retroreflectors are often arranged in resp. mounted on a carrier, which carrier is often at least partly shaped as a ball and has a cavity in which the retroreflector is positioned. A retroreflector mounted in such a way may be termed spherically mounted retroreflector.

SUMMARY

It is therefore an objective of the present disclosure to provide a spherically mounted retroreflector which can be produced cost-efficiently.

A further objective of the present disclosure is to provide a spherically mounted retroreflector with small dihedral angle error induced by temperature changes around a nominal operating temperature.

These objectives are achieved by realizing the characterizing features of the independent claim. Features which further develop aspects in an alternative or advantageous manner are described in the dependent patent claims.

The disclosure relates to a spherically mounted retroreflector. The spherically mounted retroreflector comprises 1) an optic inlay, the optic inlay comprising a retroreflector having a vertex and an axis of symmetry, and 2) a carrier having an at least partly spherical outer surface and a cavity, wherein the optic inlay is arranged in the cavity, and wherein the at least partly spherical outer surface has a sphere center, which sphere center coincides with the vertex, wherein the optic inlay is connected to the carrier. The optic inlay comprises a coupling portion, and the spherically mounted retroreflector comprises a coupling element arranged between the optic inlay and the carrier, wherein the coupling portion and the coupling element are embodied so that they correspond and interact with each other in such a way that—when connected to one another in a purely mechanical manner—translational movability of the optic inlay relative to the coupling element is limited to movability along one movement axis, in particular the axis of symmetry.

In particular, when connected to one another in a purely mechanical manner, the coupling portion and the coupling element can be moved away from each other (exclusively) along the movement axis. Accordingly, decoupling of the components (provided in a state of purely mechanical connection) can be provided only by at least initially provide relative movement of the components along the movement axis in opposite direction.

In other words, the coupling portion and the coupling element are embodied so that they correspond and interact with each other in such a way that translationally the optic inlay can at most be moved along a movement axis, in particular the axis of symmetry, away from the coupling element in case the coupling portion and the coupling element are connected to one another in a purely mechanical manner.

In context of the present disclosure, connection in a purely mechanical manner is to be understood to at least provide a mechanical contact of the respective components (e.g. coupling portion and the coupling element) without having any additional elements present which would influence stability or fitting of the components. For instance, a purely (exclusive) mechanical mounting of the coupling portion and the coupling element is already provided when bringing the coupling portion and the coupling element into contact, i.e. when providing touching of the coupling portion and the coupling element. In particular, for providing a state when the coupling portion and the coupling element are purely mechanically connected, no adhesive is present to e.g. fix the components to one another.

The coupling element is arranged between the optic inlay and the carrier. The optic inlay is configured in such a way as to be able to receive the coupling element. In a received state, i.e. in case the optic inlay has received the coupling element and optic inlay and coupling element are mechanically connected to each other, the interaction of optic inlay and coupling element limits relative translational movability between optic inlay and coupling element: in case the optic inlay is purely mechanically connected to the coupling element, the optic inlay may e.g. only be detachable from the coupling element by translating the optic inlay along the axis of symmetry away from the coupling element.

The coupling portion and the coupling element are therefore configured, respectively designed, in such a way that—once mechanically connected to each other—relative movability is already restricted by purely mechanical considerations, i.e. without additional fixing means such as adhesive.

In an embodiment of the spherically mounted retroreflector, the optic inlay is fixedly attached to the coupling element using a first attachment mechanism, and/or the coupling element is fixedly attached to the carrier using a second attachment mechanism.

Besides the movability restriction between optic inlay and coupling element purely due to mechanical restrictions imposed by the interplay between optic inlay and coupling element, a first attachment mechanism may fixedly attach the optic inlay to the coupling element and/or a second attachment mechanism may fixedly attach the coupling element to the carrier. After being fixedly attached to each other, the optic inlay may neither rotationally nor translationally be moved about the coupling element, and the coupling element may neither rotationally nor translationally be moved with respect to the carrier.

In a further embodiment of the spherically mounted retroreflector, the coupling element is embodied as a shim ball, and the optic inlay can be rotated around the shim ball in case the shim ball is connected to the optic inlay in a purely mechanical manner.

In particular, the coupling element can be embodied as a round shim ball and the optic inlay can be suitably configured to receive the shim ball. The optic inlay may then be rotated around the shim ball even after receiving the shim ball, provided e.g. no adhesive is used as first attachment mechanism between optic inlay and shim ball.

Using a shim ball, the optic inlay may be positioned in a defined relation to the carrier. A direct contact between optic inlay and shim ball and between shim ball and carrier allows high positioning accuracy between optic inlay and carrier, in particular without influence of any adhesive layers between the contacting points of the parts.

Manufacturing tolerances may lead to optic inlays of varying size. By choosing a shim ball having a suitable size, such manufacturing tolerances may be compensated, allowing an overlapping of vertex and sphere center. For industrial measurement applications, vertex and sphere center typically should lie within a distance of at most 10 micrometers to each other, i.e. with a centering tolerance of 10 micrometers.

In a further embodiment of the spherically mounted retroreflector, the retroreflector is embodied as a cube-corner retroreflector.

The retroreflector may therefore comprise three reflective surfaces which e.g. may be oriented at 90 degrees to one another.

In a further embodiment of the spherically mounted retroreflector, the retroreflector is embodied as a solid glass prism or comprises optical plastics (like a cyclo olefin polymer (COP) optical polymers, e.g. Zeonex).

In a further embodiment of the spherically mounted retroreflector, the first and/or second attachment mechanism are provided by an adhesive, the adhesive being arranged between the coupling element and the optic inlay and/or between the coupling element and the carrier in such a way that the adhesive lies on at least a part of a curved surface, which curved surface in particular corresponds to a tight sphere around the coupling element.

The adhesive, e.g. epoxy, between optic inlay and coupling element may therefore be distributed on a curved surface. Since the optic inlay may only be connected to the carrier via the coupling element, external forces applied on the carrier do not lead to forces on the optic inlay. The optic inlay is therefore strainlessly attached to the carrier. Such a strainless attachment therefore minimizes potential deformations of the optic inlay.

In a further embodiment of the spherically mounted retroreflector, the optic inlay and the coupling element and/or the coupling element and the carrier are fixedly connected to each other using pressing or a snap mechanism, and/or the coupling element and the carrier or the optic inlay and the coupling element are fixedly connected to each other using an adhesive.

In a further embodiment of the spherically mounted retroreflector, the optic inlay is embodied as an injection molded plastic or injection molded metal or metal/plastic combination to be afterwards sintered, or a 3D-printed part accompanied by post-processing to improve the surface quality. The cube-corner retroreflector can be provided by a coating of at least a part of a surface of the injection molded plastic, which coating is reflective for a wavelength of measurement radiation impinging on the spherically mounted retroreflector, the coating in particular being embodied as a gold, silver or aluminum coating.

An optic inlay manufactured with an injection molding process may be post processed at room temperature, thereby allowing the precise manufacturing of an optic inlay.

In a further embodiment of the spherically mounted retroreflector, the optic inlay comprises three main sides, wherein the three main sides are substantially orthogonal to each other, each side being substantially planar and having a respective 2D side coordinate system within a respective side plane in which the respective main side is located, the optic inlay being configured in such a way that temperature changes, in particular by up to 10 degrees Celsius around a nominal working point, substantially only deform each main side in at most the two coordinate directions of the respective 2D side coordinate system.

The behavior and shape of plastic as a material is typically strongly dependent on temperature. Changes in temperature typically lead to deformations of the plastic. An optic inlay substantially composed of plastic may therefore be subject to deformations due to temperature changes.

The three main sides may correspond to the three reflective surfaces which may be part of a cube-corner retroreflector. Each main side may lie within a plane, i.e. be substantially planar. A plane may be mathematically characterized by a two-dimensional coordinate system.

The optic inlay may be designed such that temperature changes by up to 10 degrees Celsius around a nominal working point, e.g. room temperature, substantially only deform each main side in such a way that each deformed main side is still substantially planar, i.e. within its respective side plane. The three main side, i.e. the three reflective surfaces, may therefore be designed such that within a temperature range of 20 degrees Celsius planarity of each reflective surface is preserved. Deviations from planarity in said range may in particular be in the sub micrometer range. Deformations of each reflective surface which occur substantially within its respective side plane do not impact angular accuracy of a reflected signal.

The optic inlay may be designed in an iterative process which comprises finite element analysis based simulations of the temperature behavior of the optic inlay. This iterative process may provide a mechanical design of the optic inlay which ensures high planarity of the reflective surfaces over a temperature range.

The vertex may correspond to an intersection point of the three main sides. Since the vertex and the sphere center are coincident, different thermal deformation behavior of optic inlay and carrier—the coefficient of thermal expansion of the optic inlay made of plastic is typically much larger than the coefficient of thermal expansion of the carrier, e.g. made of stainless steel—does not lead to significant relative movement between the vertex and the sphere center. The optic inlay is strainlessly attached to the carrier.

In a further embodiment of the spherically mounted retroreflector, the optic inlay is configured in such a way that temperature changes, in particular by up to 10 degrees Celsius around the nominal working point, deform the optic inlay in a symmetric manner around the coupling element.

Symmetric deformation may in particular minimize the occurrence of thermally-induced strain in the optic inlay made of plastic.

In a further embodiment of the spherically mounted retroreflector, the coupling portion is embodied as a shim ball end in which the optic inlay receives the shim ball, wherein the shim ball end of the optic inlay is symmetric around the axis of symmetry, and wherein the shim ball end has a protruding outer segment and a receded inner segment separated from each other by a recess, the receded inner segment having a curvature which is complimentary to a curvature of the shim ball, and the protruding outer segment having a contact area.

In a further embodiment of the spherically mounted retroreflector, in a received state in which the optic inlay has received the shim ball, the shim ball contacts the receded inner segment directly and a space exists between the contact area of the protruding outer segment and the shim ball, wherein the adhesive is arranged in the space, the adhesive extending between the contact area and the shim ball and fixedly attaching the shim ball to the optic inlay.

At the contact area, the protruding outer segment may also have a curvature which is complimentary to a curvature of the shim ball.

The complimentary curvature of the receded inner segment may allow accurate positioning of the shim ball with respect to the optic inlay, while the space between the contact area and the shim ball may ensure that adhesive fixedly attaching the shim ball to the optic inlay does not affect the positioning of the shim ball with respect to the optic inlay.

In a further embodiment of the spherically mounted retroreflector, the carrier has a shim ball receive part which shim ball receive part is symmetric around the axis of symmetry, wherein the shim ball receive part has a central recess and a neighboring sloped segment, wherein the shim ball contacts the sloped segment, and the adhesive between the shim ball and the carrier is arranged around the sloped segment and/or in the central recess.

In a further embodiment of the spherically mounted retroreflector, the optic inlay is only connected to the coupling element and via the coupling element indirectly to the carrier.

Only connecting the optic inlay to the carrier via the coupling element allows to minimize strains in the optic inlay caused by external forces acting on the spherically mounted retroreflector.

In a further embodiment of the spherically mounted retroreflector, the carrier is embodied as a stainless steel carrier.

In a further embodiment of the spherically mounted retroreflector, a protective ring is mounted on the carrier, which protective ring laterally surrounds parts of the optic inlay protruding from the carrier, and which protective ring is mechanically only connected to the carrier.

The protective ring may at least partly shield the reflective surfaces of the retroreflector. The optic inlay may not be mechanically connected to the protective ring.

BRIEF DESCRIPTION OF THE DRAWINGS

The system is described below in more detail purely by way of example with the aid of concrete exemplary embodiments illustrated schematically in the drawings, further advantages of the disclosure also being examined. Identical elements are labelled with the same reference numerals in the figures. In detail.

DETAILED DESCRIPTION

Figure 1:
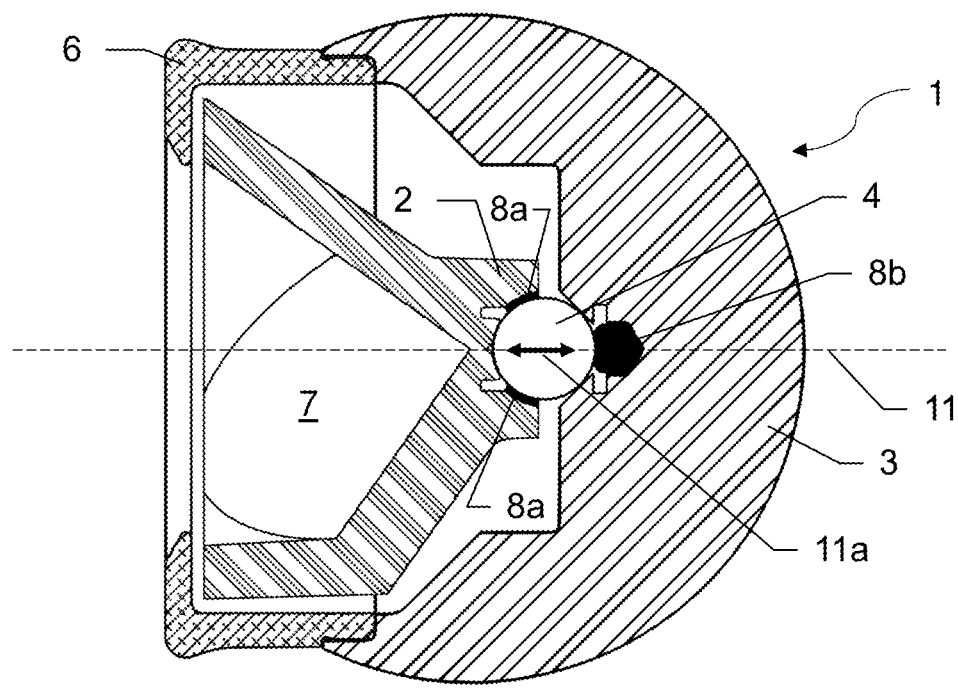
FIG. 1 shows a schematic and illustrative depiction of an embodiment of a spherically mounted retroreflector.

FIG. 1 shows a schematic and illustrative depiction of an embodiment of a spherically mounted retroreflector 1. The spherically mounted retroreflector 1 comprises an optic inlay 2, which optic inlay 2 is connected through a shim ball 4 to a carrier 3, the carrier 3 having an at least partly spherical outer surface and a cavity in which the carrier 3 receives the optic inlay 2. The optic inlay 2 is at least 3-fold symmetric, i.e. comprises at least a 120° symmetry, around the axis of symmetry 11.

The first attachment mechanism 8a between the optic inlay 2 and the shim ball 4 is provided by an adhesive in FIG. 1. The second attachment mechanism 8b between the shim ball 4 and the carrier 3 is provided by an adhesive in FIG. 1, too.

The optic inlay 2 comprises three reflective surfaces 7 of which one is shown in FIG. 1. A protective ring 6 is mounted on the carrier 3, wherein the protective ring 6 is mechanically only connected to the carrier 3 and not to the optic inlay 2.

The size of the shim ball 4 in FIG. 1 is such that the vertex of the optic inlay 2 is centered on a sphere center of the carrier 3.

Figure 2:
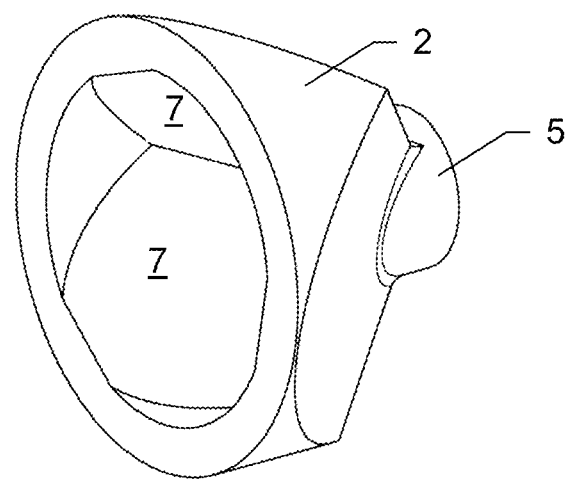
FIG. 2 shows a schematic and illustrative depiction of an optic inlay.

FIG. 2 shows a schematic and illustrative depiction of an optic inlay 2. In FIG. 2, two of the three reflective surfaces 7 of the optic inlay 2 are shown. The three reflective surfaces 7 are positioned such that incoming light is reflected back towards its source. An outside view of a coupling portion 5 is also shown in FIG. 2, in which coupling portion 5 of the optic inlay 2 is configured to receive the coupling element 4.

Figure 3:
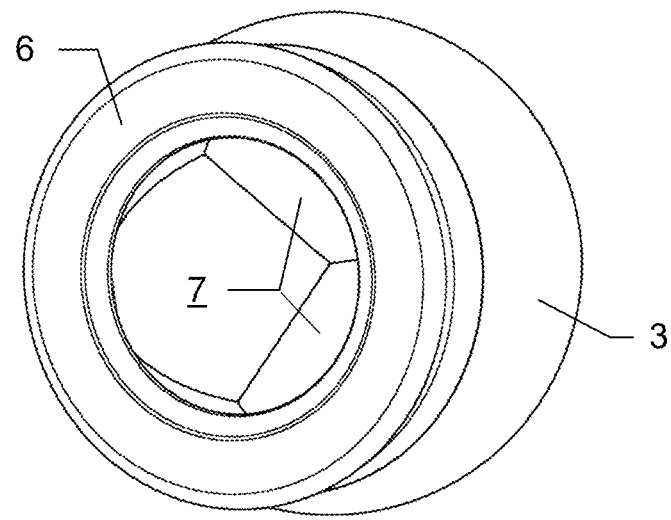
FIG. 3 shows a schematic and illustrative depiction of a spherically mounted retroreflector.

FIG. 3 shows a schematic and illustrative depiction of a spherically mounted retroreflector 1. The three reflective surfaces of the cube-corner retroreflector are visible, and the protective ring 6 mounted on the carrier 3 is shown as well.

Figure 4:
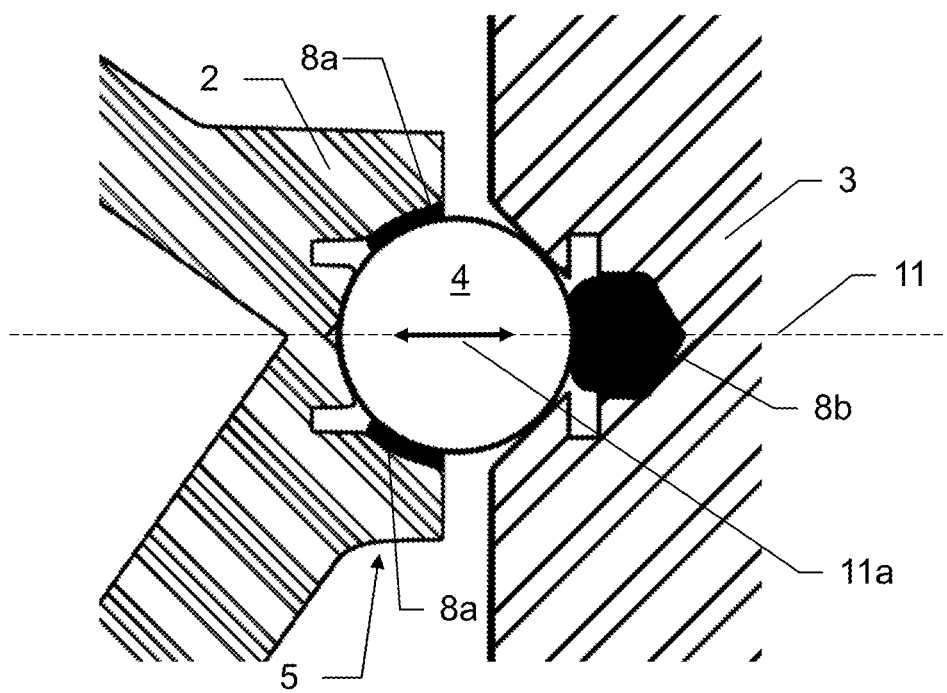
FIG. 4 shows a closer view of parts of the schematic and illustrative depiction shown in FIG. 1.

FIG. 4 shows a closer view of parts of the schematic and illustrative depiction shown in FIG. 1. The optic inlay 2 comprises a coupling portion 5 in which it receives the coupling element 4, here embodied as shim ball. The part of the optic inlay 2 at which the optic inlay 2 connects to the shim ball 4 comprises an inner segment and a surrounding protruding outer segment, wherein the inner segment and the outer segment are separated from each other by a recess. In the inner segment region, the optic inlay 2 is curved in such a way that the shim ball 4 connects tightly with the optic inlay 2 without any adhesive layer in-between. The space between the protruding outer segment and the shim ball is filled with an adhesive 8a, which adhesive provides the first attachment mechanism between the optic inlay 2 and the shim ball 4. The inner segment and the protruding outer segment are preferably built to be rotationally symmetric around the axis of symmetry 11.

The carrier 3 comprises a shim ball receive part in which it is configured to receive the shim ball 4. The shim ball receive part has a central recess and a neighboring sloped segment, wherein the shim ball touches the carrier 3 directly at the sloped segment without any adhesive layer in-between. In the central recess, an adhesive 8b is used to fixedly connect the shim ball to the carrier 3, the adhesive 8b providing the second attachment mechanism.

Two directions may be defined in FIG. 4: an axial direction along the axis of symmetry 11 and a lateral direction orthogonal to the axis of symmetry 11. The interplay between coupling portion 5, shim ball 4 and carrier 3 fixes both axial and lateral position of the optic inlay 2 to the carrier 3. Once the coupling portion 5 and the shim ball 4 interact mechanically, lateral movement of the optic inlay 2 is restricted, while axial movement (e.g., shown by arrow 11a in FIG. 1 and FIG. 4) is only possible away from the shim ball. Adhesive 8a between the optic inlay 2 and the shim ball 4 furthermore restricts motion of the optic inlay 2 away from the shim ball 4.

Figure 5:
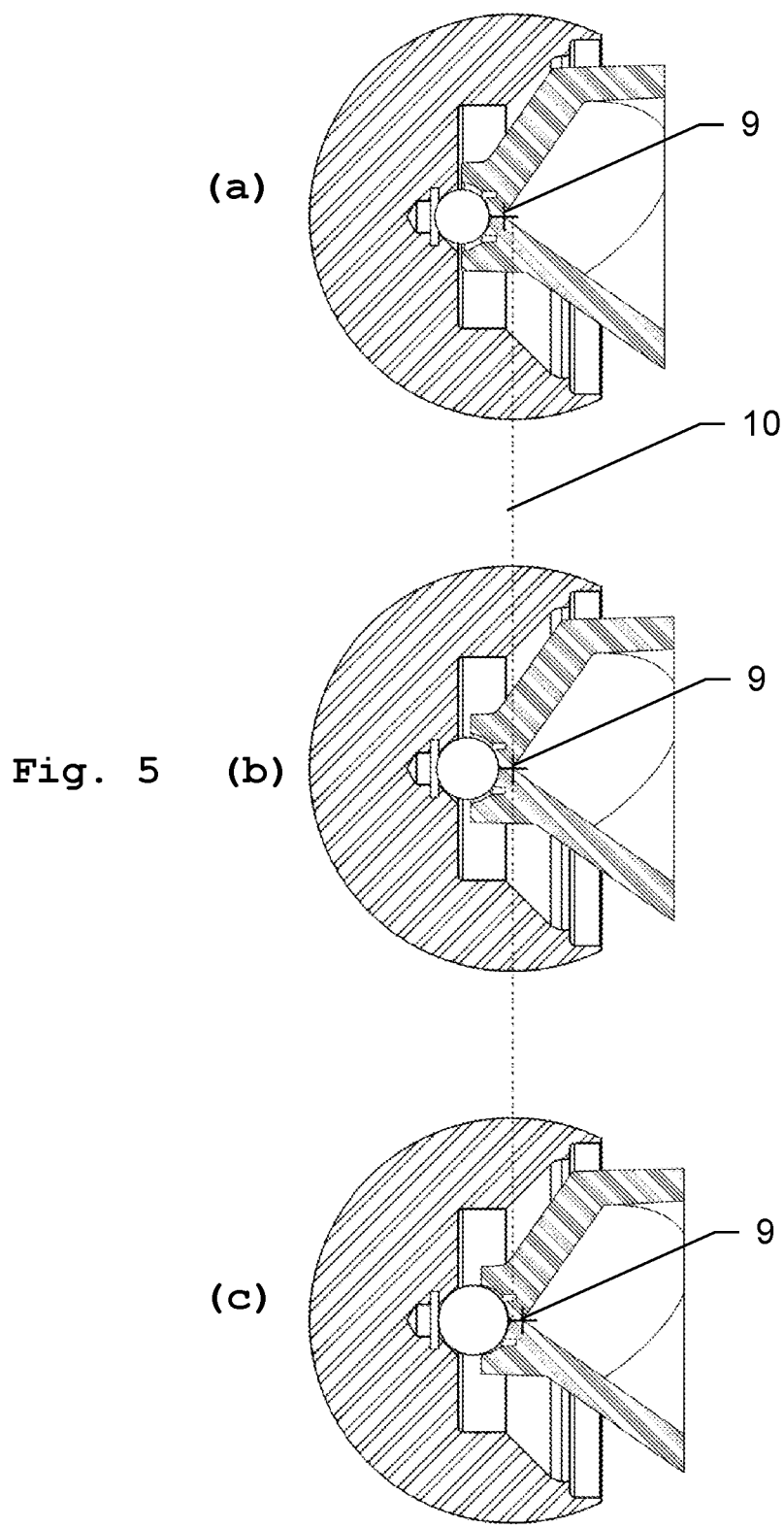
FIG. 5 shows three different schematic and illustrative depictions of embodiments of a spherically mounted retroreflector, with the embodiment in FIG. 5b being an embodiment.

FIG. 5 shows three different schematic and illustrative depictions of embodiments of a spherically mounted retroreflector, with the middle embodiment in FIG. 5b being an embodiment. In all three depictions, a vertex 9 of the optic inlay 2 is shown. A line 10 connecting the sphere centers of the carriers 3 of the three embodiments of FIG. 5 is shown as well.

In FIG. 5a, the shim ball 4 connecting the optic inlay 2 to the carrier 3 is too small. The vertex 9 of the optic inlay 2 is therefore not centered on the sphere center of the carrier 3. In FIG. 5c, the shim ball 4 is too large, again leading to a non-overlapping sphere center and vertex 9. The shim ball 4 of FIG. 5b is sized in such a way that vertex 9 and sphere center of the carrier 3 coincide.

Although aspects are illustrated above, partly with reference to some preferred embodiments, it must be understood that numerous modifications and combinations of different features of the embodiments can be made. All of these modifications lie within the scope of the appended claims.

The invention claimed is:

1. A spherically mounted retroreflector, comprising: an optic inlay, the optic inlay comprising a retroreflector having a vertex and an axis of symmetry, and a carrier having an at least partly spherical outer surface and a cavity, wherein the optic inlay is arranged in the cavity, and wherein the at least partly spherical outer surface has a sphere center, which sphere center coincides with the vertex, wherein the optic inlay is connected to the carrier, wherein the optic inlay comprises a coupling portion, and the spherically mounted retroreflector comprises a coupling element arranged between the optic inlay and the carrier, wherein the coupling portion and the coupling element are embodied so that they correspond and interact with each other, when connected to one another in a purely mechanical manner, to translationally limit movability of the optic inlay relative to the coupling element to one movement axis in the axis of symmetry.

2. The spherically mounted retroreflector according to claim 1, wherein the optic inlay is fixedly attached to the coupling element using a first attachment mechanism, and/or the coupling element is fixedly attached to the carrier using a second attachment mechanism.

3. The spherically mounted retroreflector according to claim 1, wherein the coupling element is embodied as a shim ball, and the optic inlay can be rotated around the shim ball in case the shim ball is connected to the optic inlay in a purely mechanical manner.

4. The spherically mounted retroreflector according to claim 1, wherein the retroreflector is embodied as a cube-corner retroreflector.

5. The spherically mounted retroreflector according to claim 1, wherein the retroreflector is embodied as a solid prism, in particular as a solid glass prism or comprising optical plastics.

6. The spherically mounted retroreflector according to claim 1, wherein the first and/or second attachment mechanism are provided by an adhesive, the adhesive being arranged between the coupling element and the optic inlay and/or between the coupling element and the carrier in such a way that the adhesive lies on at least a part of a curved surface, which curved surface in particular corresponds to a tight sphere around the coupling element.

7. The spherically mounted retroreflector according to claim 1, wherein the optic inlay and the coupling element and/or the coupling element and the carrier are fixedly connected to each other using pressing or a snap mechanism, and/or the coupling element and the carrier or the optic inlay and the coupling element are fixedly connected to each other using an adhesive.

8. The spherically mounted retroreflector according to claim 1, wherein the optic inlay is embodied as an injection molded plastic and/or metal, and the cube-corner retroreflector is provided by a coating of at least a part of a surface of the injection molded plastic, which coating is reflective for a wavelength of measurement radiation impinging on the spherically mounted retroreflector, the coating in particular being embodied as a gold, silver or aluminum coating.

9. The spherically mounted retroreflector according to claim 1, wherein the optic inlay comprises three main sides, wherein the three main sides are substantially orthogonal to each other, each side being substantially planar and having a respective 2D side coordinate system within a respective side plane in which the respective main side is located, the optic inlay being configured in such a way that temperature changes substantially only deform each main side in at most the two coordinate directions of the respective 2D side coordinate system.

10. The spherically mounted retroreflector according to claim 1, wherein the optic inlay is configured in such a way that temperature changes deform the optic inlay in a symmetric manner around the coupling element.

11. The spherically mounted retroreflector according to claim 3, wherein the coupling portion is embodied as a shim ball end in which the optic inlay receives the shim ball, wherein the shim ball end of the optic inlay is symmetric around the axis of symmetry, and wherein the shim ball end has a protruding outer segment and a receded inner segment separated from each other by a recess, the receded inner segment having a curvature which is complimentary to a curvature of the shim ball, and the protruding outer segment having a contact area.

12. The spherically mounted retroreflector according to claim 11, wherein in a received state in which the optic inlay has received the shim ball, the shim ball contacts the receded inner segment directly and a space exists between the contact area of the protruding outer segment and the shim ball, wherein the adhesive is arranged in the space, the adhesive extending between the contact area and the shim ball and fixedly attaching the shim ball to the optic inlay.

13. The spherically mounted retroreflector according to claim 2, wherein the carrier has a shim ball receive part which shim ball receive part is symmetric around the axis of symmetry, wherein the shim ball receive part has a central recess and a neighboring sloped segment, wherein the shim ball contacts the sloped segment, and the adhesive between the shim ball and the carrier is arranged around the sloped segment and/or in the central recess.

14. The spherically mounted retroreflector according to claim 1, wherein the optic inlay is only connected to the coupling element and is connected via the coupling element to the carrier.

15. The spherically mounted retroreflector according to claim 1, wherein a protective ring is mounted on the carrier, which protective ring laterally surrounds parts of the optic inlay protruding from the carrier, and which protective ring is mechanically only connected to the carrier.

* * * * *